June 18, 1968  R. A. REYNOLDS  3,389,313
METHOD OF AND MEANS FOR CONTROLLING THE REMOVAL
OF MATERIAL WITH A CUTTING TOOL
Original Filed Aug. 23, 1962  3 Sheets-Sheet 1
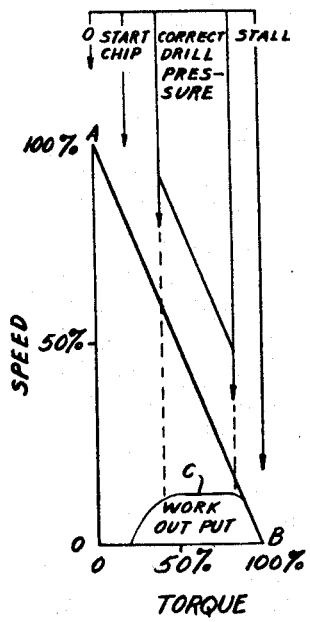
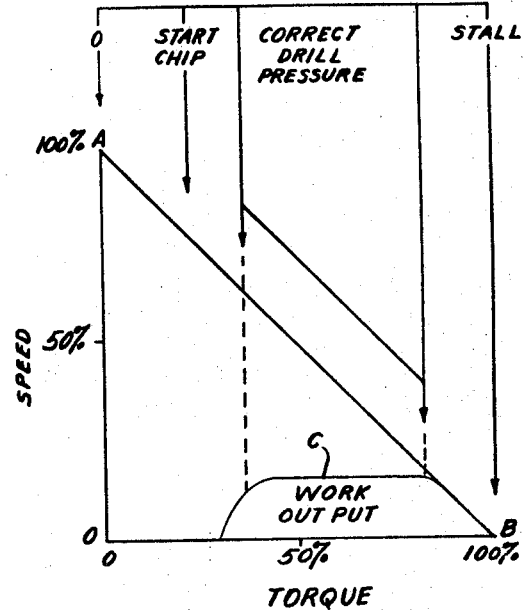
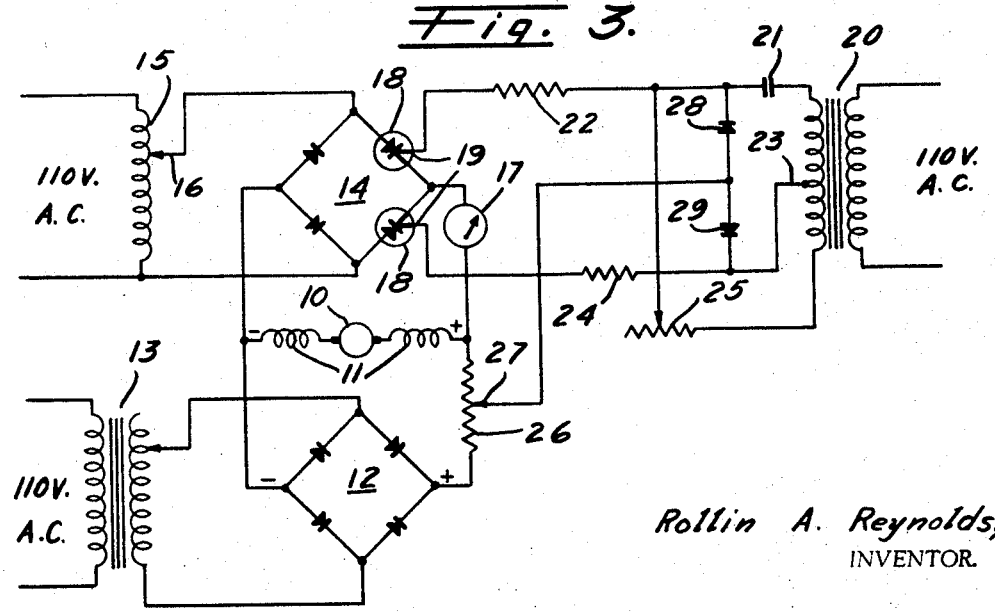
Rollin A. Reynolds,
INVENTOR.
BY Paul A. Weilein
Attorney Rollin A. Reynolds,
INVENTOR.

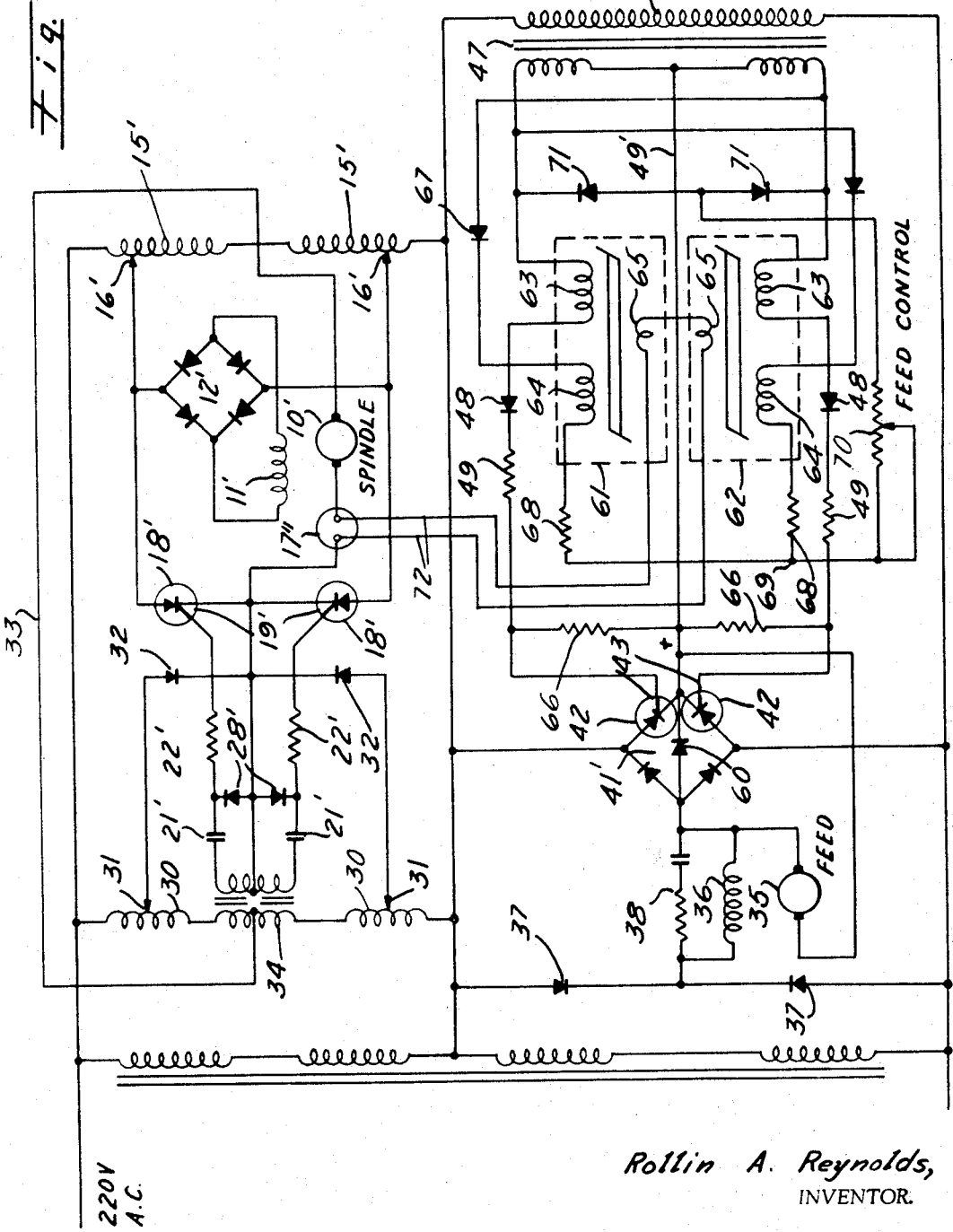

United States Patent Office 3,389,313
Patented June 18, 1968

3,389,313
METHOD OF AND MEANS FOR CONTROLLING THE REMOVAL OF MATERIAL WITH A CUTTING TOOL
Rollin A. Reynolds, Palos Verdes, Calif., assignor to Dyna Systems Inc., Torrance, Calif., a corporation of California
Application Mar. 8, 1965, Ser. No. 449,352, which is a continuation of application Ser. No. 218,991, Aug. 23, 1962, now Patent No. 3,325,710, dated June 13, 1967. Divided and this application Sept. 26, 1966, Ser. No. 604,082
11 Claims. (Cl. 318—39)

ABSTRACT OF THE DISCLOSURE

A control system for milling machines and the like having two motors, as exemplified by a D.C. spindle motor operating a tool, and D.C. feed motor for moving the work against the tool, the motors each having an armature circuit and separately excited field circuit controls adjustable to preset the speed and torque delivery of each of the motors, electronic gating devices being operable to close the armature circuit of the feed motor in response to energization of the armature circuit of the spindle motor, and wherein the spindle motor control operates to vary the speed and torque of the spindle motor so that the actual speed of the spindle motor, expressed as a percentage of a preset speed, added to the actual torque of the spindle motor, expressed as a percentage of a preset torque, is substantially constant, the load or torque of the spindle motor being utilized in a torque sensing feed back circuit for opening the gating means of the feed motor armature circuit so as to deenergize the feed motor armature when the load current of the spindle motor reaches a predetermined value, whereby the operating conditions of the tool are maintained within safe operating limits.

---

The present application is a division of my pending application, Ser. No. 449,352, filed Mar. 8, 1965, now Patent No. 3,325,710, which application constitutes a continuation of my application Ser. No. 218,991, filed Aug. 23, 1962 (now abandoned) which is a continuation-in-part of my copending application Ser. No. 100,049, filed Apr. 3, 1961, now Patent No. 3,224,338.

The present invention relates generally to improvements in the art of removing material from a work piece or the like by means of a cutting tool, and constitutes improvements in the invention disclosed in my pending application entitled Motor Control System and Torque Indicating Means, Ser. No. 14,615, filed Mar. 14, 1960, now Patent No. 3,248,629.

The invention is especially useful and embodies many inherent advantages which are most highly desirable in connection with the operation of machines and apparatus for threading, tapping, drilling, milling and similar procedures in which materials are removed by a cutting tool operating on a work piece. Such machines and apparatus are in general characterized by the use of a tool having a cutting edge which is linearly or rotatably relatively moved over the work piece, and wherein, by the application of suitable pressure, is caused to operate at a predetermined cutting depth and remove the material usually in the form of chips.

Heretofore, machines of the above character have been extremely limited with respect to the materials and machining operations which may be carried out on such materials. In this connection, such machines may be economically used only with materials which are susceptible of cutting by means of a usually available cutting tool. With the more recently developed extremely hard materials, it has in some cases been practically impossible to machine the materials of the work piece, and in others only by the utilization of the most expensive of tools has it been able to machine some of these more recent materials, and even then the tools are very short lived due to becoming dull, burning up, or other inherent undesirable effects of operation.

From exhaustive study and analysis of the presently known conventional procedures, it has been determined that the inability of the conventionally available apparatus and equipment to solve the problem is primarily due to the previous lack of appreciation of and failure to realize the importance of properly controlling the operative relationship between the driving torque, pressure for maintaining proper depth of cut, and the speed of cutting.

Under conventional machining practice, an operator selects a speed at which he thinks the particular material should be cut. There are no means for controlling the delivered torque, and as the tool pressure is increased to take a cut of greater depth, the tool does more and more work up to the point where it burns up. The present invention envisions an improved method for removing material in which the work factor remains substantially constant as a result of operating the tool so as to substantially conform to a speed-torque curve, wherein the speed and torque vary inversely. That is, as the torque is increased, the speed is decreased, and vice-versa. By utilizing the present invention, it is possible by the selection of the proper values of speed and torque to remove material with a cutting tool even from metals which previously could not be machined, and to do so by the use of conventionally available standard tools.

With the foregoing in mind, it is one object of the present invention to provide an improved method for removing material with a cutting tool, wherein the speed and torque are inversely varied so as to maintain a substantially constant work output.

Since the primary factors of torque and speed, essential to the carrying out of the method of the present invention, are concomitants of the power means utilized for actuating the tool, it follows that a logical control of the torque and speed may be obtained through the control of the power means, especially if such power means is an electric motor.

A further object of the invention is therefore concerned with the provision of improved motor control which provides for a regulatory adjustment of the torque and speed so as to substantially conform to a speed-torque curve in which the speed and torque vary inversely.

Another object is to provide a motor control system which permits a pre-setting of the torque and speed, but which is so arranged as to supply additional current to the motor armature by means of a gate control, when there is a call for increased torque.

A still further object is to provide a motor control system of the foregoing character which may be applied to a single motor cutting apparatus such as a drill press, as well as to a dual motor driven apparatus such as a milling machine.

Another object of the invention is to provide an improved motor control for machine tools utilizing more than one motor, for example, the spindle and feed motors of a milling machine; and wherein the control of one of the motors is synchronously coordinated in response to torque characteristics of the other of said motors.

Yet another object is to provide unique motor control for an electric motor, which utilizes a balanced arrangement of saturable core reactors for controlling gating devices in the motor supply circuit, these reactors being further controlled by control windings which operate to synchronously coordinate the operation of the motor with an external common signal generating source characteristic.

Further objects of the invention will be brought out in the following part of the specification, wherein detailed description is for the purpose of fully disclosing the invention without placing limitation thereon.

Referring to the accompanying drawings, which are for illustrative purposes only:

FIG. 1 is an operations curve illustrative of the method of the present invention for conditions of high speed-low torque;

FIG. 2 is a similar curve to that of FIG. 1, except for conditions of high speed-high torque;

FIG. 3 is a schematic wiring diagram of a control system for driving a cutting tool, so as to obtain speed-torque relationships according to the method of the present invention for the conditions shown in FIG. 1;

FIG. 6 is a schematic wiring diagram of another control system arrangement according to the present invention for apparatus of the herein described character utilizing two motors.

Figure 4:
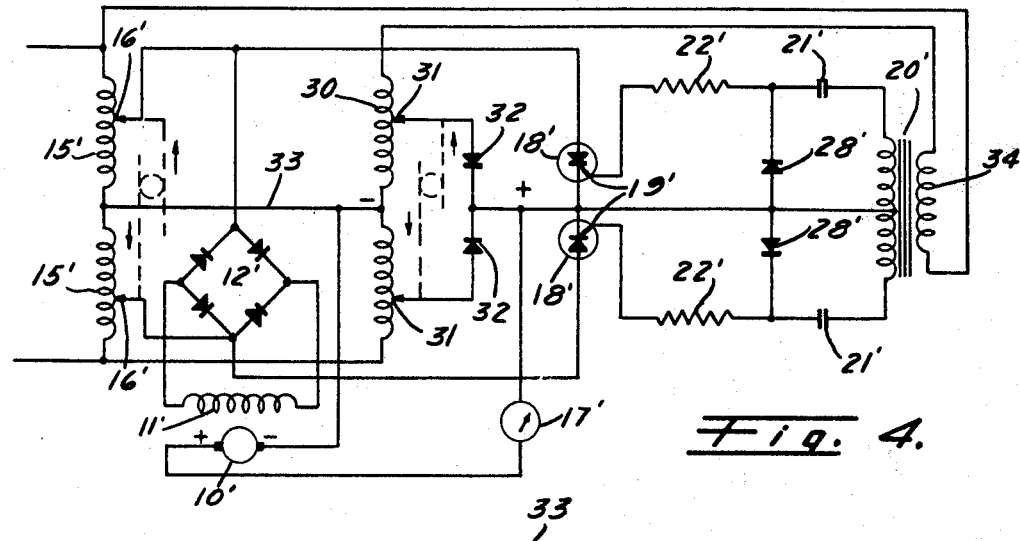
FIG. 4 is a schematic wiring diagram for a control system for obtaining the speed-torque conditions shown in FIG. 2.

Referring more specifically to the drawings, the basic concept of the method of the present invention, and the motor control system as used therein, will be described in connection with drilling apparatus, although it is to be clearly understood that the method and control may be applied to other types of material removing equipment utilizing a cutting tool.

The method of the present invention will be explained by reference to FIGS. 1 and 2, which graphically illustrate the cooperative relationship between the drill pressure, speed and torque, and which has produced an entirely new concept in this field. Practice of the method according to the present invention is made possible by the electrical means whereby the speed and torque of the power device; in this case an electric motor, may be so controlled that these factors will vary inversely along a line A–B, which indicates the conditions under which the tool must operate to prevent its destruction or work-hardening in the case of particular metallic materials.

The slope of the line A–B depends upon the size drill, tool, or size of cut. In the case of FIG. 1, the curve represents a high speed-low torque condition or operation, such as pertains to hand tools and very small tools. The curve in FIG. 2 indicates high speed and high torque operation such as pertains to larger tools or drills. Such devices may also be operated at low speed and high torque.

The manner in which the curve or line A–B may be determined will now be explained. While it is possible to feed the drill by hand, it is preferable to utilize some form of power feed such as electric feed, hydraulic feed or other means, whereby the drill pressure may be held substantially constant and easily adjusted. Such means are well known in the industry.

With the desired size drill, in the case of unknown material, a slight feed pressure is applied. By the utilization of the torque and speed controls, which will hereinafter be explained in detail, the operator sets a minimum for speed and torque in the material. The torque and feed pressure are then gradually increased until metal is being removed at the maximum rate without generating excessive heat. By reading the percentage of torque on a torque indicating meter, this reading will be indicated as point B on the graph. Now, without changing the pressure, the speed control is advanced until no further speed increase is noted. The percentage of speed then is indicated as point A on the graph. A line is then drawn between A and B, which indicates the conditions under which the tool must operate in order to prevent destruction or work hardening of materials such as in certain metals.

As shown in FIGS. 1 and 2, the work output is indicated by curve C, which it will be noted is substantially constant between the point where the chips start and where the motor stalls. By choosing the pressure at a substantially midpoint between these two conditions, operating conditions may be varied either upwardly or downwardly without damaging effects. Once the operating conditions are determined for a particular drill size and material, the control may be visually set or calculated for different sizes.

Referring to FIG. 3, the control system for the electric motor power source for accomplishing the method under the conditions graphically represented in FIG. 1 will now be described. In this case, the driving motor comprises an armature 10 and field windings 11—11 connected in series. The motor terminals are connected to receive rectified pulsating direct current from the output side of a bridge rectifier 12 having its input connected to the output side of a suitable supply transformer 13.

Connected in parallel with the pulsating supply from the rectifier 12 to the motor terminals there is also provided a rectified pulsating direct current supply from the output side of a bridge rectifier 14 having its input connected to an auto-transformer 15 through an adjustable or slide contact 16, which permits the output of the rectifier to be adjusted for control of the motor torque. The rectifier output is shown as containing a torque meter 17 which gives an indication of torque and aids in adjustment of the torque factor for practicing the method of the present invention. Moreover, it will be observed that the rectifier 14 differs somewhat from the conventional bridge rectifier in that two legs of the rectifier 14 respectively contain an electronic switching device 18, such as commercially referred to as a silicon controlled rectifier. This device has a control or a gate electrode 19, by means of which current flow may be controlled through the device in a manner well known in the electronic art.

Gating current is supplied to the gate electrodes 19 from the secondary winding of a supply transformer 20, one end of the secondary winding being connected through a capacitor 21 and current limiting resistor 22, with one of the gating electrodes. A center tap connection 23 is connected through a current limiting resistor 24 to the other gate electrode. The other end of the secondary winding is connected through an adjustable resistor 25 which forms with the capacitor 21 an R-C network which serves to provide an adjustable phase angle between the triggering or gating current and the pulsating direct current from the torque control rectifier 14.

A balance resistor 26 in the positive output connection of the rectifier 12 to the motor terminals provides a source of potential for triggering the electronic switching devices 18. A slide contact 27 associated with the resistor 26, is connected through respective diodes 28 and 29 to the feed sides of resistors 22 and 24.

Briefly, the controls shown in FIG. 3 are initially adjusted at the transformer 13 to provide constant current and voltage to the armature and field circuit of the motor as a sensing source. The adjustment of the transformer 13 determines the minimum speed, but is not enough to turn the armature. With the transformer 15 adjusted to the desired torque value, the potential drop at the resistor 26 will act to trigger the electronic switching devices 18—18, and the motor will run at the minimum speed. By adjustment of the resistor 25, the phase shift of the gating current may be varied to obtain the desired speed for operation along the line A–B, as shown in FIG. 1.

Referring to FIG. 4 of the drawings, the difference over the arrangement of control used in FIG. 3 is primarily in that the motor field and motor armature are separately energized; and in the manner of sensing and shifting the phase relationship of the triggering current. The control arrangement as shown in FIG. 4 is utilized for obtaining the operating conditions particularly shown in FIG. 2 for the method described therein. Elements in FIG. 4 similar to those of the control in FIG. 3, are indicated with corresponding numerals which are primed.

In this case, the motor field 11' is shown as being energized from a bridge rectifier 12' having its input connected with a pair of series connected auto-transformers 15', each of which has a slide contact 16'. The contacts 16'—16' are mechanically connected for gang operation in reverse directions. The adjustment of the contacts 16' similarly adjust the motor torque.

For controlling the speed of the motor, a pair of series connected auto-transformers 30—30 have their gang connected slide contacts 31—31 respectively connected to diodes 32—32, and thence through a torque meter 17' to one side of the armature 10' of the motor. The other side of the armature is connected to a bridging conductor 33 between the connected ends of the auto-transformers 15'—15' and the connected ends of the auto-transformers 30—30. Adjustment of the contacts 31—31 determine the speed setting for the motor. The auto-transformers 15'—15' feed also a parallel connected armature circuit, the slide contacts 16'—16' being respectively connected through electronic switching devices 18'—18' to the positive terminal of the armature.

In this case, provision is made for sensing a call for increased torque by providing a gating transformer 20' which has a primary winding 34 connected in series with the auto-transformers 30—30. Thus, with increased load current on the armature, triggering voltages will be applied to the gate electrodes 19'—19' to draw additional load current from the torque control auto-transformers 15'—15'. Since the torque control and speed control are independently adjustable for the motor, greater flexibility is obtainable for operation under the conditions disclosed by the graph in FIG. 2 for operation according to the method of the present invention.

Figure 5:
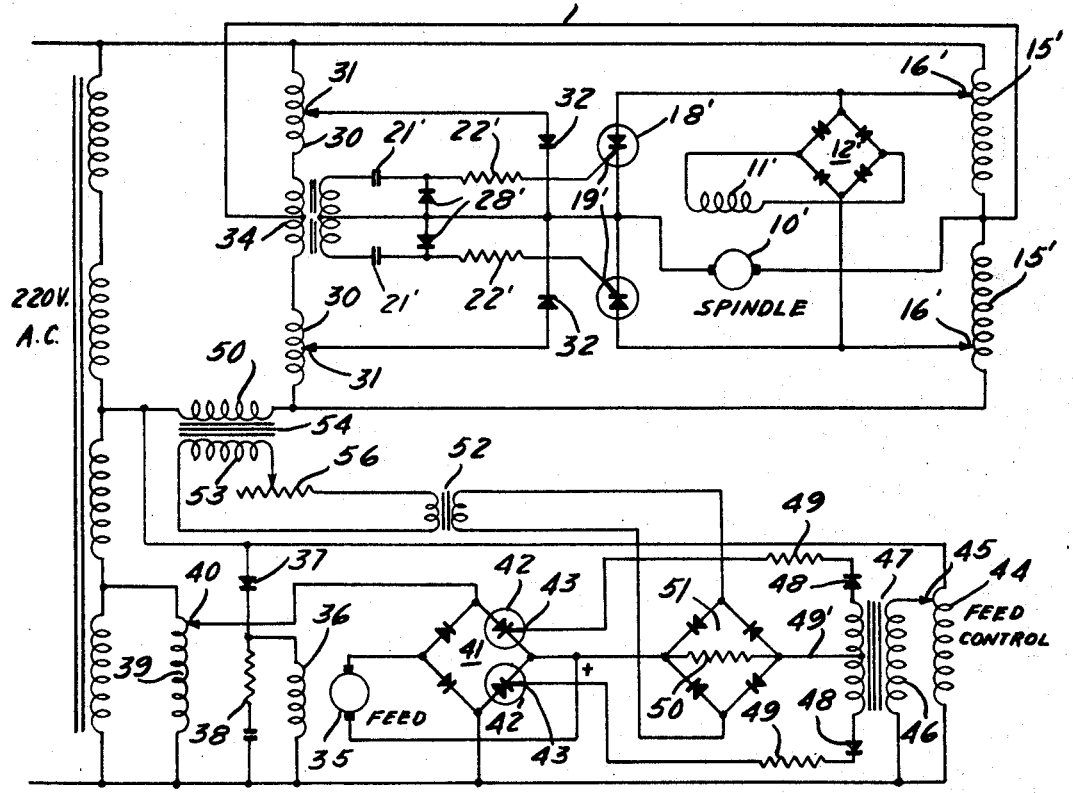
FIG. 5 is a schematic wiring diagram of one control system for practicing the method of the present invention in apparatus involving a plurality of electric driving motors.

As thus far described, the control has been utilized for a single motor, such as might be used for the driving of a drill press spindle. It will be appreciated, however, that such a spindle motor may be as a practical matter associated with a second motor such as the feed motor of a milling machine. In such arrangement, the operation of the spindle motor will in general be the same as that which may be obtained by the use of the control system shown in FIG. 4. In FIG. 5, the control system for the spindle motor has been combined and associated with the control for a second motor, namely a feed motor which in this case has an armature 35 and field winding 36. The field winding 36 is energized with rectified A.C. line voltage through a diode 37, the field winding being connected across a filter 38 in circuit with the diode 37. The armature is in this case energized from an auto-transformer 39 having a slide contact 40 whereby its output may be adjustably varied, this output being connected to supply a bridge rectifier 41 in this case. The output of the rectifier 41 is connected to the armature 35 of the feed motor. In this instance, two legs of the rectifier are provided with electronic switching devices 42—42 such as previously described. These devices each have a gating electrode 43. The feed control is adjustable by means of an auto-transformer 44, which is connected through a slide contact 45 with the primary 46 of an isolation transformer 47. The secondary of this transformer has its respective ends connected through a diode 48 and load-limiting resistor 49 to one of the gating electrodes 43.

The mid-point of the secondary winding of transformer 47 is connected by a conductor 49' to the positive terminal of the feed motor armature 35, this conductor containing a resistor 50 which bridges the output circuit of a bridge rectifier 51. The input of the bridge rectifier 51 is connected through an isolation transformer 52 with the secondary winding 53 of a transformer 54 having its primary 55 connected into the supply circuit for the spindle motor.

With the control system described above, energization of the electric supply circuit for the feed motor will at the same time energize the auto-transformer 44 and result in triggering the electronic switching devices 42—42 to start the feed motor operation.

As the spindle motor load increases, there will be a feed back through transformer 54 into the bridge rectifier 51 and thus build up a potential across the resistor 50 in such direction as to oppose the motor feed current supplied through the switching devices 42 and force this current to a value which will cause these devices to be open circuited and thus stop the feed motor. This will prevent overloading the spindle motor.

It is possible to adjust the point at which the feed motor will be stopped in relation to the load on the spindle motor by means of an adjustable resistor 56 placed in the output circuit of the secondary winding 53 of the transformer 54.

While the gate control from the auto-transformer 44 is adjustable to desired values, the value of a gating signal may be connected to a current source which is responsive to an increased speed or torque of the spindle motor. Under said circumstances the resistor 56 may be used to regulate the tracking adjustment between the spindle and feed motors.

The control system disclosed in FIG. 6 is in its broad aspects similar to that of FIG. 5 in that it is utilized for the control of a plurality of motors, such as a spindle motor and a feed motor as utilized in different types of machine tool apparatus. However, from an examination and comparison of the circuitry it will at once be apparent that the main distinction resides in the mode of feedback and the manner in which this feedback is utilized for synchronizing operation of the feed motor control so that this motor will have its operation synchronously coordinated with the torque variations of the spindle motor.

More specifically, as disclosed in FIG. 6, where similar identifying numerals have been utilized to indicate corresponding elements to those previously described, a bridge rectifier 41' supplies rectified current to the armature 35 in a manner similar to that of the rectifier 41 in the arrangement of FIG. 5. However, in this case a diode 60 is connected across the terminals of the rectifier 41' to provide a so-called "free-wheeling" or by-pass shunt across the armature 35 which constitutes an inductive load.

It will also be observed that the feedback circuit in FIG. 5, containing the bridge rectifier 51 and the supply transformer 54 in the feed circuit of the spindle motor, has been eliminated, and that control of the gating electrodes 43 is obtained instead by means of a pair of saturable reactors 61 and 62 containing magnetic cores of the square loop type. Each of these reactors is provided with a gate winding 63, a bias winding 64 and a separate control winding 65.

The end terminals of the secondary winding of isolation transformer 47 are respectively connected through one of the gate windings 63, diode 48 and the load-limiting resistor 49 to one of the gating electrodes 43, while the mid-point of a transformer secondary is connected directly by the conductor 49' to the positive terminal connection of the armature 35 to the bridge rectifier 41'. A gate firing signal is thus obtained from the winding 63 which is supplied by the mid-tap voltage of the secondary winding of the transformer 47. When the cores of the reactors are unsaturated, the winding 63 forms a relatively high impedance to the gate signal so that only a small voltage is developed across the gate voltage-limiting resistor 66. However, when the core saturates, the decreased impedance permits a large voltage to appear at the gate causing it to fire. The resistor 49 limits gate current. The diode 48 prevents reverse voltage on the gate as well as reverse current to the winding 63, which might produce an undesired reset of the reactor core.

The winding 64 of each reactor has one terminal connected to the opposite end of a secondary winding of the transformer 47 to that which connects to its associated winding 63, the connection containing a diode 67. Each winding 64 connects through a resistor 68 to a common juncture point 69 from which a return is established through a common feed control potentiometer 70 and one or the other of diodes 71 to the other end of the secondary winding of the transformer 47.

The windings 64 are connected to magnetize the reactor cores in each case in a direction opposite that of the windings 63. The winding 64 thus operates in a reset mode by controlling the reset voltage during the negative half cycle. The setting of the potentiometer 70 determines the amount of reset of the core during the negative half cycle, thus determining the phase angle of conduction of the electronic switching devices 42 during the positive half cycle. As thus arranged in conjunction with the armature 35 of the feed motor, the potentiometer setting determines the tool loading.

The control windings 65—65 are connected in series to a feedback circuit 72 which is connected across the terminals of a torque meter 17″ or other load responsive means which will detect the current flow in the armature circuit of the armature 10′ of the spindle motor. The windings 65—65 are thus operated in the magnetomotive force mode in response to variations in the torque of the spindle motor and determine the core flux level of the concomitant firing angle.

With the arrangement described above, greater stability of operation and flexibility of control is obtained in which the two motors are synchronized by means of an isolated torque feedback circuit. The tool loading may be set at a constant value, and the speed control of the feed motor modulated in a synchronized coordinated manner with respect to the torque characteristic of the spindle motor.

Various modifications may suggest themselves to those skilled in the art without departing from the spirit of my invention, and hence, I do not wish to be restricted to the specific forms shown or uses mentioned, except to the extent indicated in the appended claims.

I claim:

1. A control system for a milling machine spindle motor and feed motor, each of said motors having an armature circuit and separately excited field, comprising: separate circuits for respectively energizing the armature circuit of each of said motors; means for presetting the speed and torque delivery of each of said motors; gating means for closing the armature circuit to energize said feed motor in response to energization of the armature circuit of said spindle motor; means for varying the speed and torque of said spindle motor so that the actual speed of said spindle motor, expressed as a percentage of a preset speed, added to the actual torque of said spindle motor, expressed as a percentage of a preset torque, is substantially constant; and means for opening said gating means to deenergize said feed motor armature circuit when the load current of said spindle motor reaches a predetermined value.

2. Apparatus for removing material from a workpiece with a cutting tool, comprising: power means for effecting movement of said tool and said workpiece relatively in a cutting direction, control means for establishing for said power means a maximum speed of operation and a maximum deliverable force, said control means including means for sensing changes in resistance to said movement, and means responsive to said sensing means for changing the speed of said movement in such a manner that the actual speed, expressed as a percentage of said maximum speed, added to the actual force, expressed as a percentage of said maximum force, is substantially constant, second power means for effecting movement of said tool and said workpiece relatively in a feeding direction, and means responsive to said sensing means for varying the effect of said second power means as the actual force for effecting said cutting movement varies.

3. Apparatus for removing material from a workpiece with a cutting tool, comprising: electric motor power means for effecting movement of said tool and said workpiece relatively in a cutting direction, control means for establishing for said motor a maximum speed and a maximum deliverable torque, and regulator means responsive to the actual torque for relatively regulating the speed of said motor in such a manner that the actual speed, expressed as a percentage of said maximum speed, added to the actual torque, expressed as a percentage of said maximum torque, is substantially constant, second electric motor power means for effecting movement of said tool and said workpiece relatively in a feeding direction, and means responsive to said regulator means for relatively varying the effect of said second power means.

4. In a control system for a pair of electric motors wherein the load on one of said motors is varied by the speed of the other of said motors, means for establishing for each of said motors a maximum speed and a maximum torque, torque sensing means for detecting the load on said one motor, means responsive to said torque sensing means for relatively adjusting the speed and torque of said one motor in such a manner that the actual speed, expressed as a percentage of said maximum speed, added to the actual torque, expressed as a percentage of said maximum torque, is substantially constant, and means responsive to said torque sensing means for inversely varying the actual speed of said other of said motors.

5. A control system for material working apparatus having two motors, each of said motors having an armature and field, comprising: separate circuits for respectively energizing the armature of each of said motors; means for presetting the speed and torque delivery of each of said motors; torque responsive means in circuit with the armature of one of said motors; means for varying the speed of said one of said motors in response to variations in said torque responsive means; and means including gating elements for controlling energization of the armature circuit of said other motor in response to variations in said torque responsive means.

6. A control system for material working apparatus having two motors, each of said motors having an armature and field; a source of operating voltage connected to the armature of one of said motors through unidirectional conducting means including a pair of electronic gating devices, each having a gate control electrode; means coupled between said control electrodes and said operating voltage including means adjustable to vary the operation of said gating devices so as to adjust the speed of said one of said motors; means for generating a potential opposing current flow in said armature circuit including a resistor in circuit with said unidirectional conducting means; means responsive to armature load current of the other of said motors for generating a unidirectional current flow through said resistor dependent upon the value of said armature load current; and speed adjusting means responsive to armature load current of said other of said motors for varying the speed of said other of said motors.

7. A control system for material working apparatus having two motors, each of said motors having an armature and field; a source of operating voltage connected to the armature of one of said motors through unidirectional conducting means including a pair of electronic gating devices, each having a gate control electrode; means coupled between said control electrodes and said operating voltage including means adjustable to vary the operation of said gating devices so as to adjust the speed of said one of said motors, said adjusting means comprising a common circuit connection to said devices; a bridge rectifier having an input circuit and an output circuit; a resistor in said common connection to said devices connected across said rectifier output circuit; means in circuit with the armature of the other of said motors for generating a potential variable in accordance with the load current of its armature; and means coupling said potential generating means with the input of said bridge rectifier.

8. A control system for a direct current motor having an armature circuit, comprising: a source of operating voltage connected to said armature through unidirectional conducting means including a pair of electronic gating devices for determining current flow to said armature, said gating devices each having a gate control electrode; and a pair of saturable core reactors having windings respectively coupled between said operating voltage and said control electrodes, bias control windings connected with said source through unidirectional conducting devices in circuit with common adjusting means, and series connected control windings for augmenting the effect of said bias windings in response to a separately generated signal.

9. A control system for material working apparatus having two motors, each of said motors having an armature and field; a source of operating voltage connected to the armature of one of said motors through unidirectional conducting means including a pair of electronic gating devices, each having a gate control electrode; a pair of saturable core reactors each having a gating device control winding, a bias winding and a separate control winding; means coupling each of said gate control electrodes with said source through a circuit containing a diode and a gating control winding; means coupling each of said bias windings with said source through a control circuit containing a diode connected with each bias winding, and a potentiometer in a common connection to said bias windings; and means coupling said separate control windings with a voltage source variable in response to armature load current of the other of said motors.

10. A control system for material working apparatus having two motors, each of said motors having an armature and field; a source of operating voltage connected to the armature of one of said motors through unidirectional conducting means including a pair of electronic gating devices, each having a gate control electrode; a pair of saturable core reactors each having a gating device control winding, a bias winding and a separate control winding; means coupling each of said gate control electrodes with said source through a circuit containing a diode and a gating control winding; means coupling each of said bias windings with said source through a control circuit containing a diode connected with each bias winding, and a potentiometer in a common connection to said bias windings; means in circuit with the armature of said other motor for generating an output signal in response to variations in its torque; and means coupling said separate control windings with said output signal means.

11. A control system for material working apparatus having two motors, each of said motors having an armature and field; a source of operating voltage connected to the armature of one of said motors through unidirectional conducting means including a pair of electronic gating devices, each having a gate control electrode; a pair of saturable core reactors each having a gating device control winding, a bias winding and a separate control winding; means coupling each of said gate control electrodes with said source through a circuit containing a diode and a gating control winding; means coupling each of said bias windings with said source through a control circuit containing a diode connected with each bias winding, and a potentiometer in a common connection to said bias windings; means in circuit with the armature of said other motor for generating an output signal in response to variations in its torque; and means coupling said separate control windings with said output signal means; said control windings being series connected.

References Cited

UNITED STATES PATENTS

| | | | |
|---|---|---|---|
| 1,871,750 | 8/1932 | Shaw | 318—39 |
| 2,411,162 | 11/1946 | King | 318—39 |
| 2,491,983 | 12/1949 | King et al. | 318—39 |
| 2,989,674 | 6/1961 | Hawkins et al. | 318—39 |
| 3,259,023 | 7/1966 | Rieger et al. | |

ORIS L. RADER, *Primary Examiner.*

B. A. COOPER, *Assistant Examiner.*